(12) United States Patent
Chang

(10) Patent No.: US 8,467,965 B2
(45) Date of Patent: Jun. 18, 2013

(54) NAVIGATION SYSTEM AND ROUTE PLANNING METHOD USING THE SAME

(75) Inventor: Chien-Yang Chang, Taoyuan (TW)

(73) Assignee: Mitac International Corp., Taoyuan (TW)

( * ) Notice: Subject to any disclaimer, the term of this patent is extended or adjusted under 35 U.S.C. 154(b) by 24 days.

(21) Appl. No.: 12/961,837

(22) Filed: Dec. 7, 2010

(65) Prior Publication Data

US 2011/0137552 A1 Jun. 9, 2011

(30) Foreign Application Priority Data

Dec. 8, 2009 (TW) .............................. 98141849 A

(51) Int. Cl.
*G01C 21/00* (2006.01)
(52) U.S. Cl.
USPC ........................................ 701/527; 340/995.1
(58) Field of Classification Search
USPC ................. 701/200, 201, 119, 117, 209, 400, 701/411–417, 527
See application file for complete search history.

(56) References Cited

U.S. PATENT DOCUMENTS

| | | | | |
|---|---|---|---|---|
| 6,118,389 A * | 9/2000 | Kamada et al. | ........... | 340/995.21 |
| 6,278,941 B1 * | 8/2001 | Yokoyama | ..................... | 701/420 |
| 6,480,783 B1 * | 11/2002 | Myr | ............................... | 701/117 |
| 7,203,598 B1 * | 4/2007 | Whitsell | ........................ | 701/521 |
| 7,845,680 B2 * | 12/2010 | Abe et al. | ....................... | 280/739 |
| 2002/0128773 A1 * | 9/2002 | Chowanic et al. | ............. | 701/210 |
| 2003/0120422 A1 * | 6/2003 | Cochlovius et al. | .......... | 701/201 |
| 2005/0251324 A1 * | 11/2005 | Wiener et al. | ................. | 701/200 |
| 2008/0091348 A1 * | 4/2008 | Choi | .............................. | 701/210 |
| 2009/0082950 A1 * | 3/2009 | Vorona | .......................... | 701/119 |
| 2009/0138190 A1 * | 5/2009 | Kulik et al. | .................... | 701/119 |
| 2010/0094532 A1 * | 4/2010 | Vorona | .......................... | 701/119 |
| 2011/0060523 A1 * | 3/2011 | Baron | ........................... | 701/224 |

FOREIGN PATENT DOCUMENTS

| | | |
|---|---|---|
| CN | 100552741 C | 10/2009 |
| CN | 101685024 B | 7/2012 |

* cited by examiner

*Primary Examiner* — Thomas Black
*Assistant Examiner* — Shardul Patel
(74) *Attorney, Agent, or Firm* — Birch, Stewart, Kolasch & Birch, LLP

(57) ABSTRACT

A route planning method for a navigation system of a moving object. The method comprises planning and executing a first navigation route; labeling lane entrances in a road corresponding to a substitute navigation route according to a location of the moving object when traffic information is detected, and planning and executing a second navigation route according to the lane entrance.

18 Claims, 5 Drawing Sheets

NAVIGATION SYSTEM AND ROUTE PLANNING METHOD USING THE SAME

CROSS REFERENCE TO RELATED APPLICATIONS

This application claims priority of Taiwan Patent Application No. 098141849, filed on Dec. 8, 2009, the entirety of which is incorporated by reference herein.

BACKGROUND OF THE INVENTION

1. Field of the Invention

The present invention relates to a route planning method of a navigation system, and in particular relates to a substitute route pre-planning method of a navigation system.

2. Description of the Related Art

Global positioning system, abbreviated GPS, is a navigation system that integrates satellite and wireless technologies to provide a user's precise location, speed and local time. GPS is used extensively, and many GPS technologies and business opportunities are developed rapidly as satellite technologies advance. At early stage, GPS was intended only for military units and used for military purposes such as the precision positioning of fighters, ships, motor vehicles, ground personnel and targets. Currently, GPS is free for civilian use and can be used in the positioning, and in technologies such as integrating space satellites and communication technology which is developed rapidly. For example, GPS can provide accurate information such as the speed, direction and distance of a moving vehicle. This enables emergency vehicles such as ambulances to accomplish life-saving mission more effectively. The driver of the vehicle can maintain constant awareness of their current position and obtain route information to a target destination using an electronic map.

The present portable navigation device mainly comprises a touch screen and function keys around the touch screen. The touch screen mainly shows the function menu, input interface and 2D/3D navigation mode. The user selects the function shown on the screen by pressing the function key or directly touching the screen or via voice control. Furthermore, the user can input the starting point and the destination via hand writing and the GPS then navigates according to the start point and the destination.

BRIEF SUMMARY OF THE INVENTION

An embodiment of the invention is a route planning method for a navigation system of a moving object. The method comprises the following steps: planning and executing a first navigation route; labeling a lane entrance in a road corresponding to a substitute navigation route according to a location of moving object when traffic information is detected; and planning and executing a second navigation route corresponding to the lane entrance.

Another embodiment of the invention is a navigation system for a moving object. The navigation system comprises a positioning unit, a traffic detector, a route planning unit, a display unit and a navigation unit. The positioning unit detects a location of the moving object. The traffic detector receives traffic information. The route planning unit plans a first navigation route according to the location and a destination, acquires a lane entrance corresponding to a substitute route according to the location and the traffic information, and plans a second navigation route according to the location, the traffic information and the destination. The display unit labels the location of the lane entrance. The navigation unit executes one of the first navigation routes and the second navigation route according to the traffic information and the location of the moving object.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
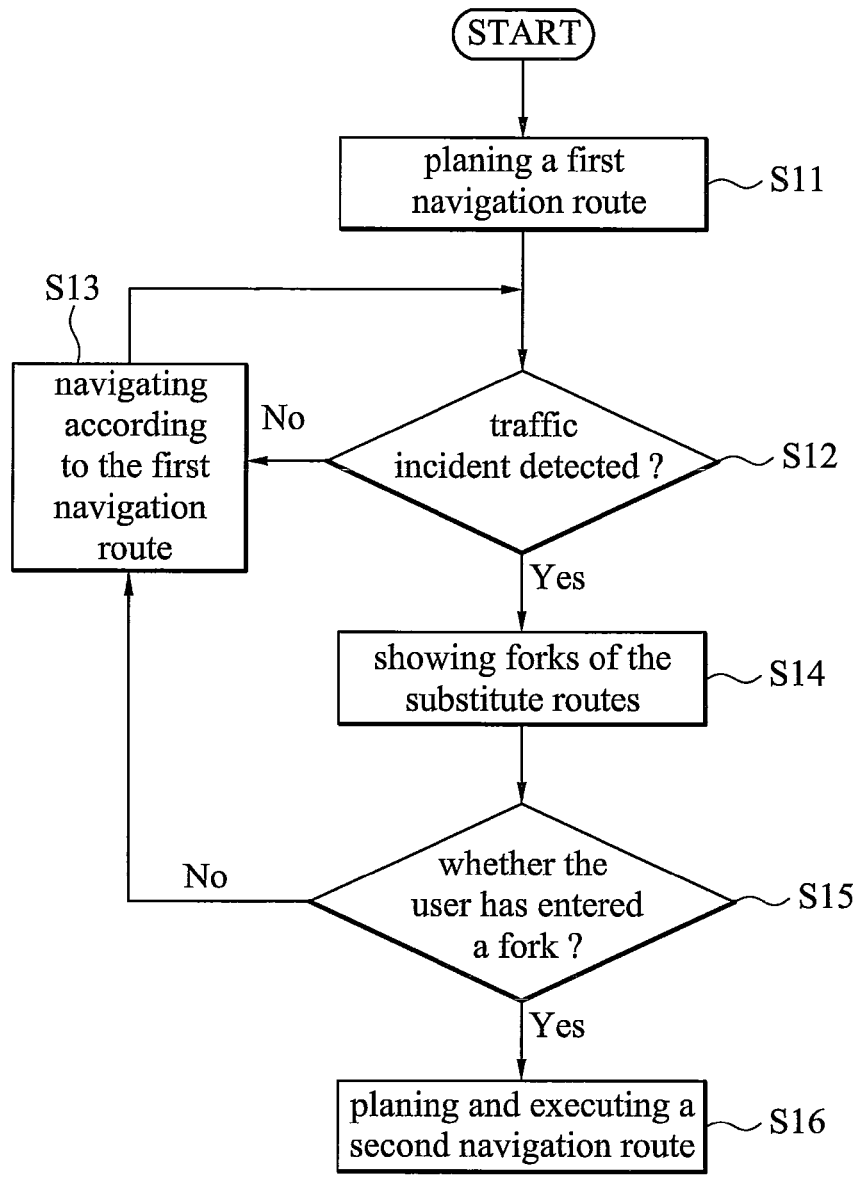
FIG. 1 is a flow chart of an embodiment of a route planning method of a navigation system according to the invention.

FIG. 1 is a flow chart of an embodiment of a route planning method of a navigation system according to the invention. In step S11, the navigation system first plans a first navigation route according to the starting point and the destination of the user and navigates according to the first navigation route. In step S12, the navigation system detects whether a traffic incident happens. In this embodiment, the traffic incident represents road construction, car accident, traffic jam and other complications. If no traffic incident is detected, step S13 is executed, then, the navigation system continues to navigate according to the first navigation route. In one embodiment of the step S12, the navigation system determines whether a traffic jam is occurring according the current speed, distance moved or the idle time of the user. For example, if the speed of the user decreases from 80 km/hour to 20 km/hour for a predetermined period of time, the navigation system therefore determines the user is in a traffic jam. The navigation system executes step S14 to give the user appropriate instructions to leave the traffic jam. According to one embodiment of the invention, the predetermined period of time can be set according to the effective time of the local traffic light (green light or red light). If the effective time of the local traffic light is 90 seconds and the user maintains his moving speed of 20 km/hour for more than 90 seconds, the navigation system therefore determines the user is in a traffic jam. According to another embodiment of step S12, if the moving distance of the user within a predetermined period of time is less than a predetermined distance, the navigation system therefore determines the user is in a traffic jam. According to another embodiment of step S12, if the duration or motionless period of the user within a predetermined area is longer than a predetermined period of time, the navigation system therefore determines the user is in a traffic jam and executes step S14. According to another embodiment of the step S12, the type of traffic incident may be determined by a traffic data processing center, and the traffic data processing center broadcasts different traffic incidents according to different regions.

In step S14, when the navigation system determines that the user is in a traffic jam, the navigation system analyses the user's current location to find and label the lane entrances which can help avoid the detected traffic incident and the lane entrances which may be encountered on the display device to help the user avoid one-way streets and dead ends. The lane entrance which is not with a dead end road would be marked for user to get away from the traffic jam. Since in this stage reroute has not yet been done, to labeling a lane entrance that is not with a dead end road is the fastest way to help user to get away from the route that will meet the traffic jam. The substitute route could be calculated at the same time or even after the user leave the predetermined route. In the present embodiment, the navigation system may show information related to the lane entrances, such as the street name, the remaining distance to the destination or the road width. Moreover, the navigation system can rank and show the priority of the possible travel routes or show the status of the lane entrances, such as one-way streets or dead ends. Next, in step S15, the navigation system determines whether the user has entered a lane entrance. If the user has turned to the suggested lane entrance, the navigation system executes step S16 to plan a second navigation route corresponding to the chosen lane entrance; the user can therefore leave the traffic jam area and travel to the destination along the second navigation route. If user did not turn to the suggested lane entrance, the navigation method goes to the step S13. The navigation system continues to navigate for the user according to the first navigation route and keeps on detecting the traffic situation. In another embodiment, the navigation system can plan all the possible routes corresponding to the lane entrances which may avoid the traffic incident. If user turns to a specific lane entrance or leaves the first navigation route for a predetermined distance, such as 50 meters, the navigation system shows the corresponding route of the chosen lane entrance.

Figure 2:
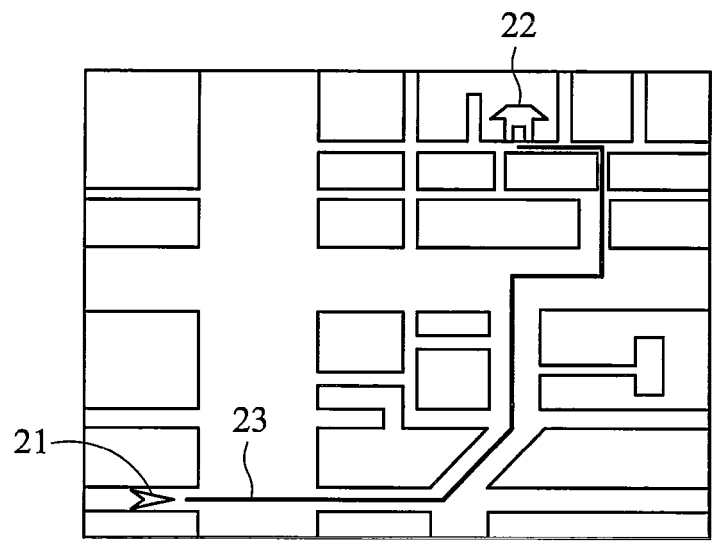
FIGS. 2-5 show the screens of the display of the navigation device using the navigation method of FIG. 1.
Figure 3:
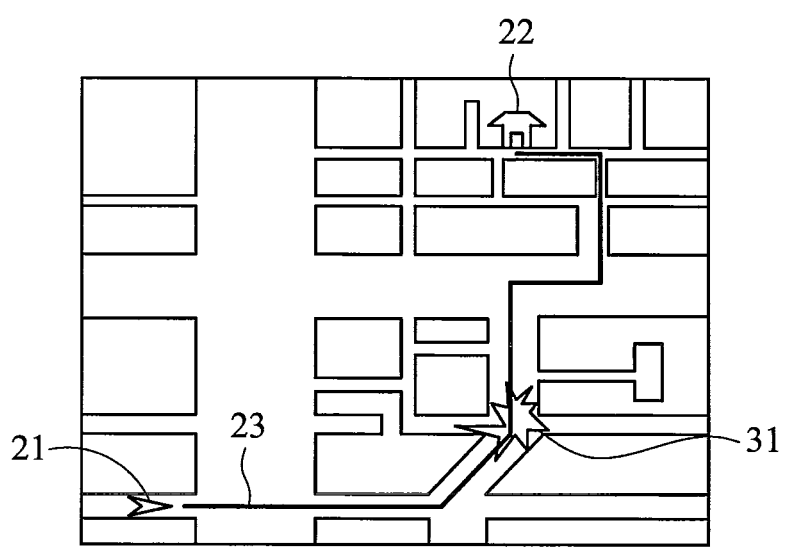
Figure 4:
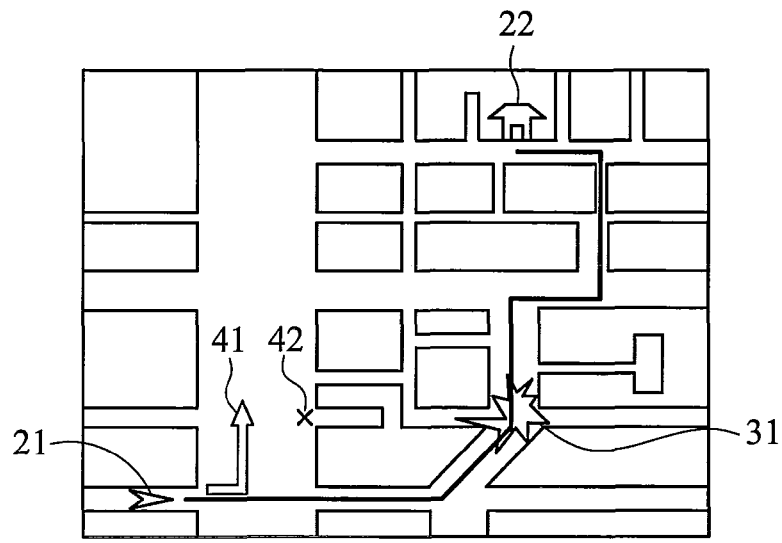
Figure 5:
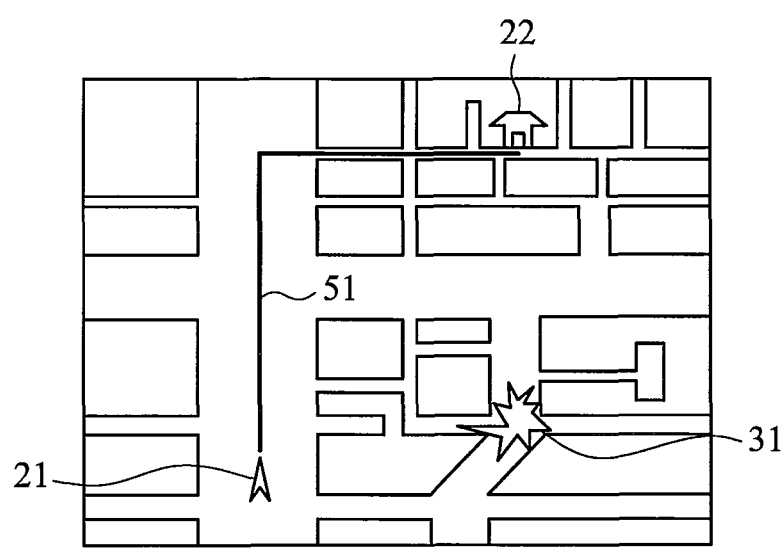

For further illustration, please refer to FIGS. 2-5. FIGS. 2-5 show the screens of the display of the navigation device using the navigation method of FIG. 1. In FIG. 2, the user 21 wants to go back to the destination 22 from the present location and the navigation system provides a navigation route 23. In FIG. 3, when user 21 goes to the destination 22 along the navigation route 23, the navigation system detects that the traffic incident 31 as it happens. In FIG. 4, the navigation system provide a lane entrance 41 which can avoid the traffic incident 31 and the navigation system also shows the lane entrance 42 which indicates a dead end to warn the user not to enter. In FIG. 5, the navigation system detects that the user 21 has left the navigation route 23 and turned towards the lane entrance 41. The navigation therefore plans another navigation route 51 for user and cancels the original navigation route 23, thus, the display of the navigation device shows only the substitute navigation route 51.

Figure 6:
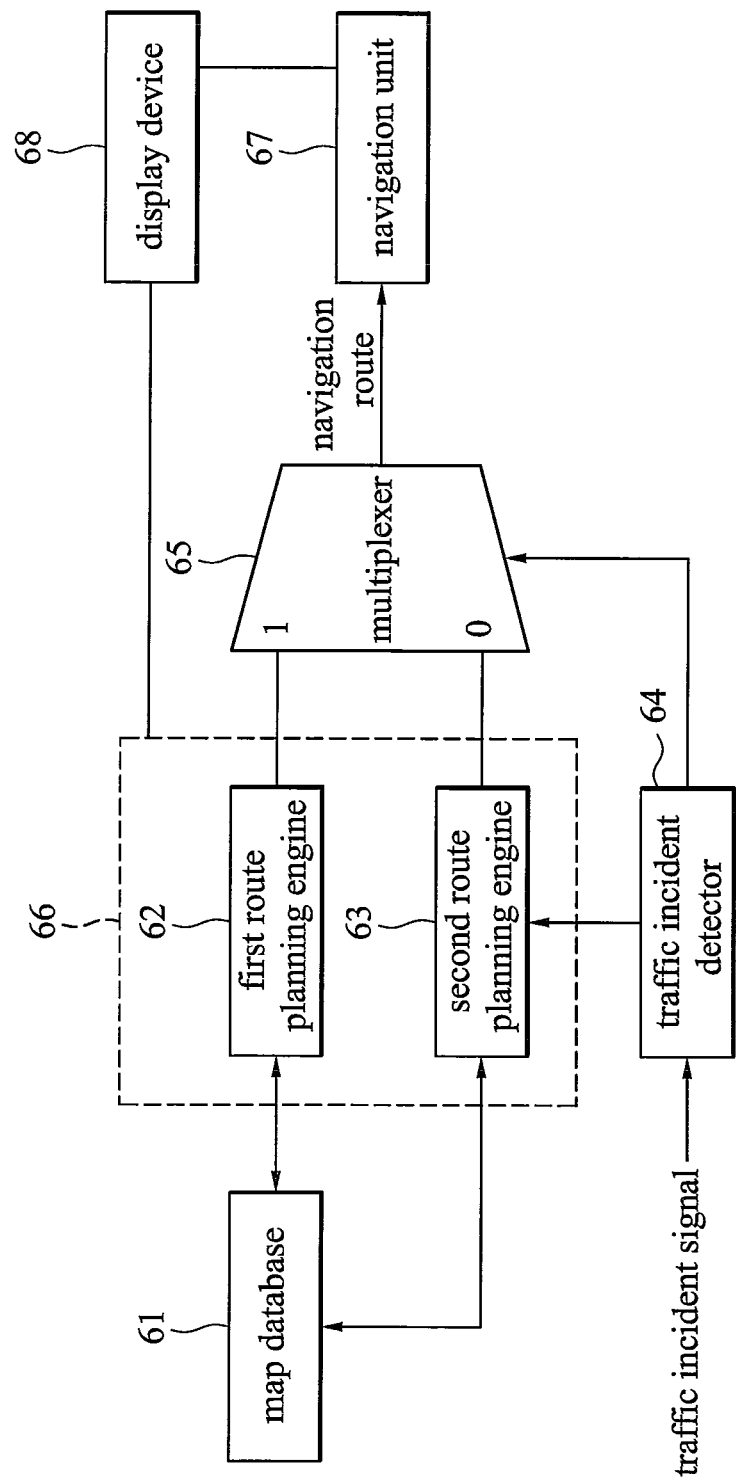
FIG. 6 is a functional block diagram of an embodiment of a navigation system according to the invention.

FIG. 6 is a schematic diagram of an embodiment of a navigation system according to the invention. The route planning unit 66 comprises a first route planning engine 62 and a second route planning engine 63. The first route planning engine 62 plans the first route according to map database 61, current location of user and destination. The traffic incident detector 64 receives traffic information which is provided by a traffic data processing center. The traffic data processing center broadcasts different traffic incidents according to the traffic of different regions, or the navigation system can determine the traffic incidents by itself according to the speed and current status of user. When the traffic incident detector 64 detects traffic incidents, the route planning unit 66 analyses and shows the lane entrances which can be used to avoiding the traffic incident and lane entrances which should be avoided on a display device 68. The traffic incident detector 64 issues an enabling signal to the second route planning engine 63. The second route planning engine 63 plans the second route according to the map database 61, current location of the user, the lane entrance which can be used to avoid the traffic incident and destination. The multiplexer 65 receives the first route and the second route and outputs the first route or the second route according to a select signal from the traffic incident detector 64. The navigation unit 67 navigates for the user according to the first route or the second route from the multiplexer 65. In this embodiment, if the traffic incident detector 64 receives the traffic information and the select signal is "0", the navigation unit 67 shows only the second route on the display device 68. If the traffic incident detector 64 does not receive the traffic information and the select signal is "1", the navigation unit 67 shows only the first route on the display device 68.

Figure 7:
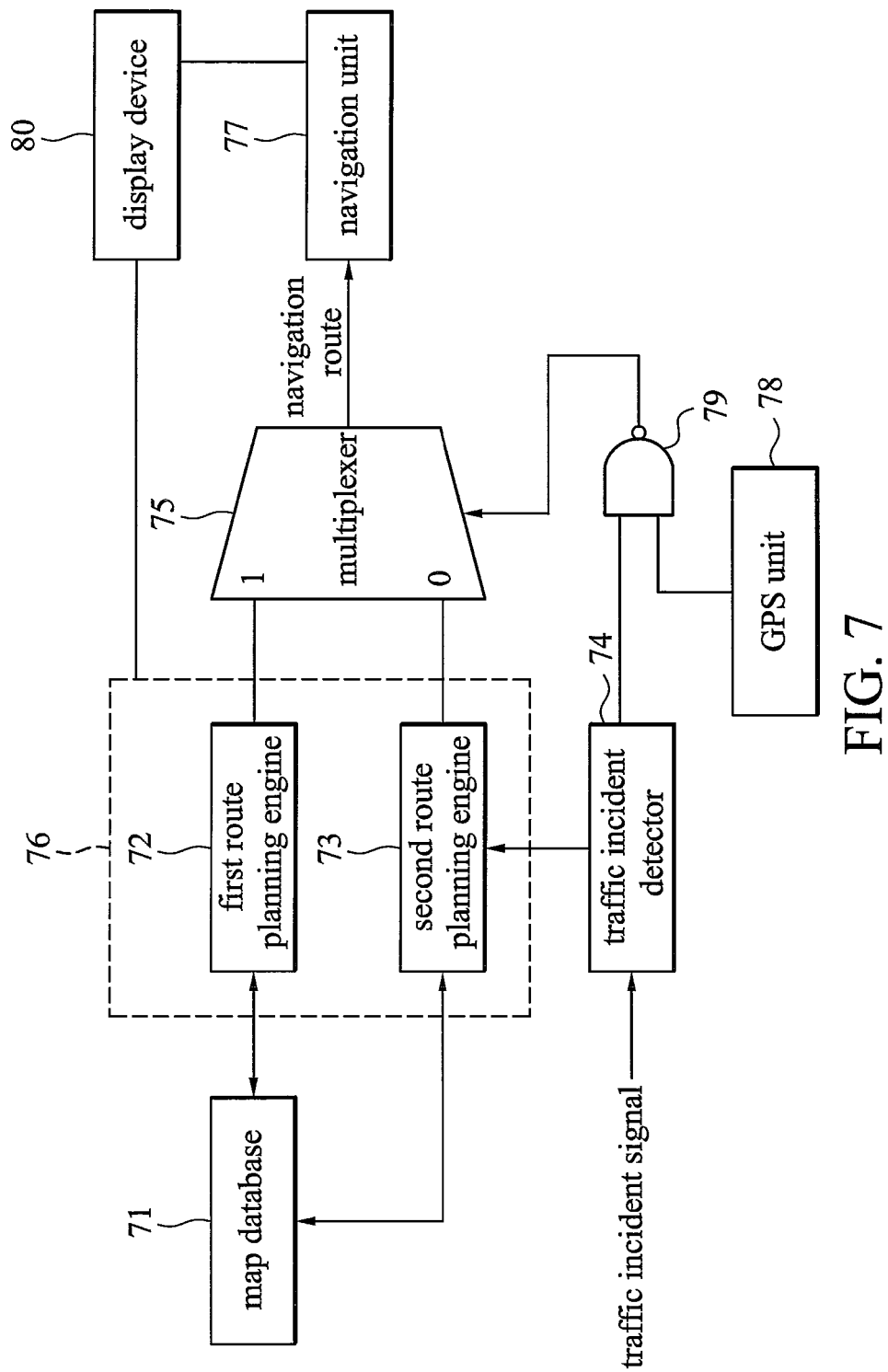
FIG. 7 is a functional block diagram of another embodiment of a navigation system according to the invention.

FIG. 7 is a schematic diagram of another embodiment of a navigation system according to the invention. According to the navigation method of the navigation system of FIG. 7, the navigation system shows the lane entrances which can be used to avoid traffic incidents and the lane entrances which cannot be used when receiving the traffic information and determines whether the user has turned to the suggest lane entrance to avoid the traffic incident according to the user's location. If yes, the navigation system navigates according to the second route corresponding to the lane entrance which user turned in. If not, the navigation system navigates according to the first route.

The route planning unit 76 comprises a first route planning engine 72 and a second route planning engine 73. The first route planning engine 72 plans the first route according to map database 71, current location of user and destination. The traffic incident detector 74 receives traffic information which is provided by a traffic data processing center. The traffic data processing center broadcasts different traffic incidents according to the traffic of different regions, or the navigation system can determines the traffic incidents by itself according to the moving state of user. When the traffic incident detector 74 detects traffic incidents, the route planning unit 76 analyses and shows the lane entrances which can be used to avoiding the traffic incident and lane entrances which should be avoided on a display device 80. The traffic incident detector 74 issues an enabling signal to the second route planning engine 73. The second route planning engine 73 then plans the second route according to the map database 71, current location of user and the lane entrance which can be used to avoid the traffic incident and destination. The multiplexer 75 receives the first route and the second route and outputs the first route or the second route according to a select signal from the NAND gate 79. The navigation unit 77 shows the first route or the second route from the multiplexer 75 on the display device 80 and navigates the user according to the chosen one.

GPS unit 78 detects the user's location to determine whether the user has turned to the second route. If yes, the output signal is "1", and if not, the output signal is "0". If the traffic incident detector 74 receives the traffic information and the select signal is "1", and if the traffic incident detector 74 does not receive the traffic information and the select signal is "0". The NAND gate 79 receives the enabling signal from the traffic incident detector 75 and the output signal of the GPS unit 78.

When the traffic incident detector 74 receives the traffic information and the GPS unit 78 detects that user had turned to the second route, the output signal of NAND gate 79 is "0", and the multiplexer 75 transmits the second route to the navigation unit 77 for navigating.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A route planning method for a navigation system of a moving object, comprising: planning and executing a first navigation route; labeling marks at lane entrances around a moving object before planning a second navigation route when traffic information is detected; labeling the lane entrance to be avoided with a first mark and labeling the lane entrance which is not to be avoided with a second mark; and planning the second navigation route when the moving object deviates from the first navigation route according to the lane entrance; planning the second navigation route corresponding to a first lane entrance while detecting that the moving object had been moving to make a turn at the first lane entrance, wherein when a first lane entrance leads a user to a dead end, a No Entrance sign is labeled at the first lane entrance.

2. The method as claimed in claim 1, wherein the traffic information is provided by a traffic data processing center.

3. The method as claimed in claim 1, wherein the traffic information is generated according to speed of movement, the duration of movement or the distance which the object has traveled.

4. The method as claimed in claim 1, wherein the traffic information is generated when the movement speed of the moving object is lower than a predetermined speed for a predetermined duration.

5. The method as claimed in claim 1, wherein the traffic information is generated when the distance moved of the moving object during a predetermined time period is less than a predetermined distance.

6. The method as claimed in claim 1, wherein the traffic information is generated when the duration of the moving object within a predetermined range is longer than a predetermined duration.

7. The method as claimed in claim 1, further comprising: showing related information corresponding to the lane entrance by the navigation system.

8. The method as claimed in claim 7, wherein the related information comprises a street name, the remaining distance to the destination and the road width.

9. The method as claimed in claim 1, further comprising: the navigation system labeling the lane entrance to be avoided and showing related information thereof.

10. A navigation system for a moving object, comprising: a positioning unit to detect a location of the moving object; a traffic detector to receive a traffic information; a route planning unit to plan a first navigation route according to the location and a destination, to acquire a lane entrance according to the location and the traffic information, and to plan a second navigation route according to the location, the lane entrance, the traffic information and the destination; planning the second navigation route corresponding to first lane entrance while detecting that the moving object had been moving to make a turn at the first lane entrance; a display unit to label a make at the location of the lane entrance before the route planning unit plans the second navigation route, label the lane entrance to be avoided with a first mark and label the lane entrance which is not to be avoided with a second mark; and a navigation unit to execute one of the first navigation routes and the second navigation route according to the traffic information and the location of the moving object wherein when a first lane entrance leads a user to a dead end, a No Entrance sign is labeled at the first lane entrance.

11. The system as claimed in claim 10, wherein when a traffic incident happens, the route planning unit acquires the lane entrance which can lead the moving object to get away from the route that will meet the traffic incident.

12. The system as claimed in claim 10, wherein the traffic information is provided by a traffic data processing center.

13. The system as claimed in claim 10, wherein the traffic information is generated according to a moving speed, a moving time period or a moving distance of the moving object.

14. The system as claimed in claim 10, wherein the traffic information is generated when the moving speed of the moving object is lower than a predetermined speed for a predetermined duration.

15. The system as claimed in claim 10, wherein the traffic information is generated when a moving distance of the moving object during a predetermined time period is less than a predetermined distance.

16. The system as claimed in claim 10, wherein the traffic information is generated when a duration of the moving object within a predetermined range is longer than a predetermined duration.

17. The system as claimed in claim 10, further comprising: showing related information corresponding to the lane entrance by the navigation system.

18. The system as claimed in claim 17, wherein the related information comprises one of a street name, a remaining distance to the destination and a road width.

* * * * *